US012708849B2

(12) United States Patent
Liu et al.

(10) Patent No.: US 12,708,849 B2
(45) Date of Patent: Aug. 18, 2026

(54) METHOD AND APPARATUS FOR PROCESSING AUDIO IN GAME, AND STORAGE MEDIUM AND ELECTRONIC APPARATUS

(71) Applicant: NETEASE (HANGZHOU) NETWORK CO., LTD., Hangzhou (CN)

(72) Inventors: Mingzhe Liu, Hangzhou (CN); Meng Li, Hangzhou (CN); Junping Wang, Baoding (CN); Xiaoping He, Shenzhen (CN); Shengqiang Wu, Hangzhou (CN); Haiyu Zhang, Qingdao (CN); Zijian Tang, Hangzhou (CN)

(73) Assignee: NETEASE (HANGZHOU) NETWORK CO., LTD., Hangzhou City (CN)

( * ) Notice: Subject to any disclaimer, the term of this patent is extended or adjusted under 35 U.S.C. 154(b) by 198 days.

(21) Appl. No.: 18/837,901

(22) PCT Filed: Sep. 28, 2022

(86) PCT No.: PCT/CN2022/122225

§ 371 (c)(1),
(2) Date: Aug. 13, 2024

(87) PCT Pub. No.: WO2023/151283

PCT Pub. Date: Aug. 17, 2023

(65) Prior Publication Data

US 2025/0144523 A1 May 8, 2025

(30) Foreign Application Priority Data

Feb. 14, 2022 (CN) ......................... 202210135103.3

(51) Int. Cl.
*A63F 13/54* (2014.01)

(52) U.S. Cl.
CPC ...... *A63F 13/54* (2014.09); *A63F 2300/6081* (2013.01)

(58) Field of Classification Search
CPC ......... A63F 13/54; A63F 13/825; A63F 13/58
See application file for complete search history.

(56) References Cited

U.S. PATENT DOCUMENTS 10,572,016 B2 * 2/2020 Ballard ................. A63F 13/285
11,878,246 B1 * 1/2024 Smith ..................... H04S 7/305
(Continued)

FOREIGN PATENT DOCUMENTS

CN 101347043 A 1/2009
CN 108597530 A 9/2018
(Continued)

OTHER PUBLICATIONS

International Search Report dated Dec. 6, 2022 of International Application No. PCT/CN2022/122225.
(Continued)

*Primary Examiner* — Reginald A Renwick
(74) *Attorney, Agent, or Firm* — Qinghong Xu

(57) ABSTRACT

A method for processing audio in a game includes: determining a target position of a virtual game character in a game scene; determining, based on the target position, a target spatial region in the game scene; determining a first position of a virtual item in response to determining that the virtual item enters the target spatial region, and a second position of the virtual item in response to determining that the virtual item leaves the target spatial region; and determining, based on the first position and the second position, first audio data corresponding to the virtual item, where the first audio data is used for indicating an orientation change of the virtual item during movement from the first position to the second position.

20 Claims, 7 Drawing Sheets

(56) References Cited

U.S. PATENT DOCUMENTS

| | | | | |
|---|---|---|---|---|
| 2003/0007648 | A1* | 1/2003 | Currell | H04S 7/305 381/63 |
| 2005/0249367 | A1 | 11/2005 | Bailey | |
| 2017/0163907 | A1* | 6/2017 | Connolly | H04N 5/2228 |
| 2018/0109901 | A1* | 4/2018 | Laaksonen | A63F 13/577 |
| 2018/0352018 | A1* | 12/2018 | Mate | H04L 65/613 |
| 2020/0053464 | A1* | 2/2020 | Peters | G06F 3/165 |
| 2020/0296532 | A1 | 9/2020 | Wang et al. | |
| 2020/0348387 | A1 | 11/2020 | You et al. | |
| 2022/0062766 | A1* | 3/2022 | Dom | H04S 7/304 |
| 2023/0020792 | A1* | 1/2023 | Tajik | H04S 7/304 |

FOREIGN PATENT DOCUMENTS

| | | | |
|---|---|---|---|
| CN | 110270094 | A | 9/2019 |
| CN | 114504820 | A | 5/2022 |
| JP | H0499580 | A | 3/1992 |
| JP | H0499581 | A | 3/1992 |
| JP | H04242684 | A | 8/1992 |
| JP | H10165645 | A | 6/1998 |
| JP | 2007180935 | A | 7/2007 |
| JP | 2007259888 | A | 10/2007 |
| JP | 2013012811 | A | 1/2013 |
| JP | 2017221554 | A | 12/2017 |
| JP | 2020156588 | A | 10/2020 |
| JP | 2020156589 | A | 10/2020 |

OTHER PUBLICATIONS

1st Office Action dated Sep. 30, 2025 of Japanese Application No. 2024-545203.

* cited by examiner

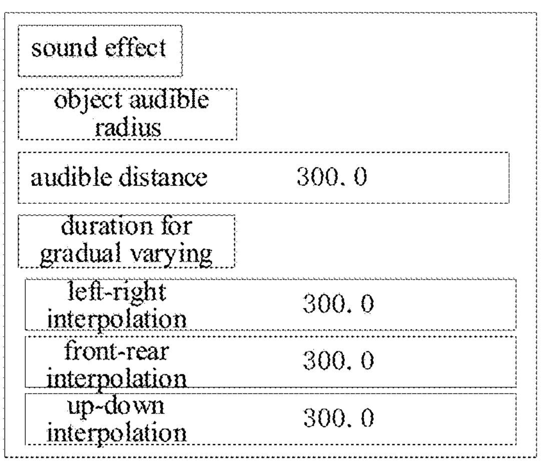
FIG. 8
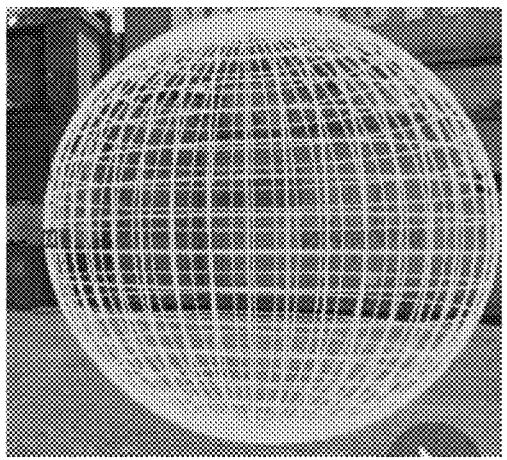
FIG. 9
BulletWhoosh_Left_Right
range
minimum -300
maximum 300. 0
default value 0
BulletWhoosh_Distance
range
minimum 0
maximum 300. 0
default value 150
FIG. 10
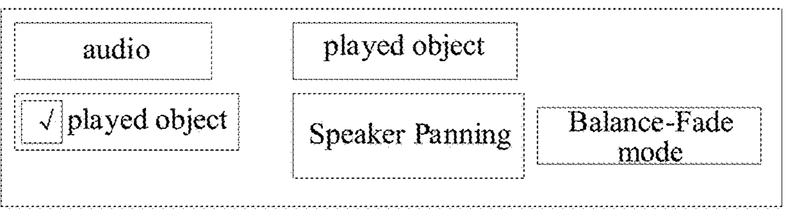
FIG. 11(a)

METHOD AND APPARATUS FOR PROCESSING AUDIO IN GAME, AND STORAGE MEDIUM AND ELECTRONIC APPARATUS

CROSS-REFERENCE TO RELATED APPLICATIONS

The present disclosure is a U.S. National Phase Application of International Application No. PCT/CN2022/122225, filed on Sep. 28, 2022, which claims the priority to the patent application No. 202210135103.3, entitled "METHOD AND APPARATUS FOR PROCESSING AUDIO IN GAME, AND STORAGE MEDIUM AND ELECTRONIC APPARATUS", the entire contents of both of which are incorporated into the present disclosure by reference for all purposes.

TECHNICAL FIELD

The present disclosure relates to the field of computers and, specifically, to a method and apparatus for processing audio in a game, a storage medium and an electronic apparatus.

BACKGROUND

Currently, most games can only play an attack sound effect of a virtual item in a fixed position, and it is difficult to consider a change of the sound effect in a process of high-speed movement of the virtual item. Thus, there is a technical problem of poor audio playing effects in games.

SUMMARY

The present disclosure provides a method and apparatus for processing audio in a game, a storage medium and an electronic apparatus.

According to one embodiment of the present disclosure, a method for processing audio in a game is provided to achieve the above objects. The method may include: determining a target position of a virtual game character in a game scene; determining, based on the target position, a target spatial region in the game scene; determining first position information of a virtual item when the virtual item enters the target spatial region, and second position information of the virtual item when the virtual item leaves the target spatial region; and determining, based on the first position information and the second position information, first audio data corresponding to the virtual item, where the first audio data is used for indicating an orientation change state of the virtual item during movement from the first position information to the second position information.

According to another aspect of the present disclosure, a non-transitory computer-readable storage medium is also provided to achieve the above objects. The computer-readable storage medium stores a computer program, where the computer program, when executed by a processor, controls a device where the computer-readable storage medium is located to perform the method for processing audio in a game in the embodiments of the present disclosure.

According to another aspect of the present disclosure, an electronic apparatus is also provided to achieve the above objects. The electronic apparatus may include a memory and a processor, where the memory stores a computer program, and the processor is set to run the computer program to perform the method for processing audio in a game in the embodiments of the present disclosure.

BRIEF DESCRIPTION OF THE DRAWINGS

The accompanying drawings illustrated herein are used to provide a further understanding of the present disclosure and form a part of the present disclosure. The schematic embodiments of the present disclosure and their illustrations are used for explaining the present disclosure, and do not constitute an improper limitation on the present disclosure. In the accompanying drawings:

FIG. 8 is a schematic diagram of adjustment parameters according to one embodiment of the present disclosure;

FIG. 9 is a schematic diagram of a spherical audible range with coordinate information on a surface according to one embodiment of the present disclosure;

FIG. 10 is a schematic diagram of establishing real-time control parameters and setting attributes according to one embodiment of the present disclosure;

FIG. 11(*b*) is a schematic diagram of a waveform of a bullet fly-past sound effect sample according to one embodiment of the present disclosure;

DETAILED DESCRIPTION

Figure 1:
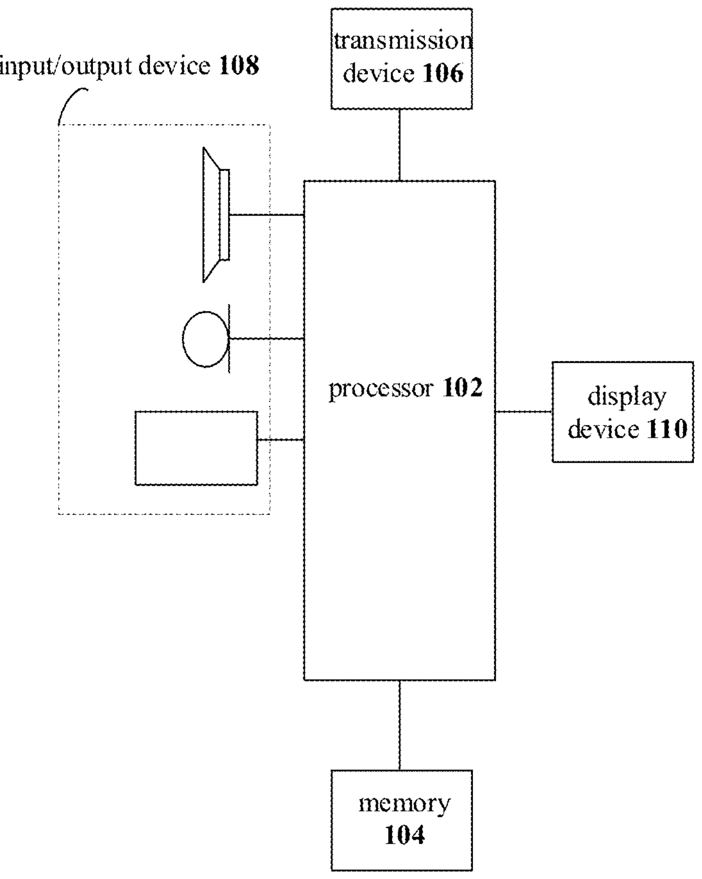
FIG. 1 is a block diagram of a hardware structure of a mobile terminal for a method for processing audio in a game according to one embodiment of the present disclosure.

In order to enable those skilled in the art to better understand the technical solutions of the present disclosure, the technical solutions in the embodiments of the present disclosure will be described clearly and completely in the following in conjunction with the accompanying drawings in the embodiments of the present disclosure. It is apparent that the described embodiments are only a part of the embodiments of the present disclosure, but not all of the embodiments. Based on the embodiments in the present disclosure, all other embodiments obtained by those ordinary skilled in the art without making creative labor should fall within the scope of protection of the present disclosure.

It should be noted that the terms "first", "second", etc. in the specification, claims and accompanying drawings described above in the present disclosure are used for distinguishing between similar objects, and are not necessarily used for describing a particular order or sequence. It should be understood that the data used in this way may be interchangeable in appropriate cases, so that the embodiments of the present disclosure described herein can be implemented in an order other than those illustrated or described herein. In addition, the terms "include", "have" and any variations thereof are intended to cover non-exclusive inclusion, e.g., a process, method, system, product, or apparatus that includes a series of steps or units is not necessarily limited to those clearly listed steps or units, but rather may include other steps or units that are not clearly listed or inherent to the process, method, product, or apparatus.

Firstly, some nouns or terms that appear in the description of the embodiments of the present disclosure are applicable to the following explanations.

Audio Engine (Wwise), an audio engine used for interfacing with a game engine, which can achieve rich game interactive audio solutions.

Object (Event), used for receiving calls sent from the game engine; and in the Event, which audio related actions are executed correspondingly to this call is set. For example, the most commonly used actions include playing a certain piece of audio, terminating a certain piece of audio, and resetting certain parameters, etc.

Doppler Effect, e.g., a listener may hear a tone of a sound of a car change from high to low as the car speeds past the listener.

Left-Right Sound Image Parameter (Pan) of Stereo Audio, which relies on the "binaural effect" of humans to produce effects, e.g., when the left-right sound image parameter is set to extreme left, headphones/speakers may emit sound only from the left channel, and the listener may perceive the sound emitter as being on the left side.

Low Pass Filtering (Low Pass), a filtering effect that filters out high frequencies and allows only low frequencies to pass through. If this effect is applied to audio, the resulting sound becomes "muffled".

Volume, a parameter that refers to a volume level in audio field.

Digital Audio Workstation (abbreviated as DAW), refers to a multi-track, multi-function audio and music editing software.

Automation Control Information (Automation), automation control information in the digital audio workstation, which is often attached to a track in the digital audio workstation in the form of "drawn lines". The playback may be executed according to various musical instrument digital interface (MIDI) parameters and audio parameters associated with and controlled by these "lines", thereby achieving sound parameter changes that follow pre-edited parameter effects, such as volume gradually decreasing, left-right sound image gradually varying, turning on and off of track mute, etc.

Real-Time Control Parameter (RTPC), a type of control information in the audio engine, which plays a similar role to the automation control information in the digital audio workstation, and can have a corresponding effect on the sound parameter in the audio engine. The only difference is that the specific real-time control parameter value is not pre-drawn like the automation control information, but rather it is determined by a certain piece of data in the game.

First-Person Shooter (abbreviated as FPS) Game, which is a generic term of shooting-type electronic games that are performed by using the player's first-person perspective as the main viewpoint, and generally requires the use of firearms or other weapons for battle.

Third-Person Shooter (abbreviated as TPS) Game, which is a shooting game that differs from the first-person shooter game in that only the protagonist's field of view is displayed on the screen in the first-person shooter game, whereas the third-person shooter game places more emphasis on a sense of action, with the protagonist being visible on the game screen.

Sound Sample, refers to an audio clip or an audio file that actually emits a sound in a game sound effect.

Random Sample, where some sounds in the game may be triggered continuously and frequently, and in order to make the representation of these sounds more realistic and less repetitive, a plurality of very similar sound samples are often formed into a collection, and one of them is triggered randomly each time.

Whoosh, refers to a "swoosh" or "swish" sound emitted by an item that flies past rapidly or emitted by an item that is wielded across, which may be used for indicating a sound of a car driving by rapidly, an object flying past, a weapon being wielded, or a rope being wielded. For example, Bullet Whoosh may refer to "a bullet fly-past sound".

According to one embodiment of the present disclosure, there is provided an embodiment of a method for processing audio in a game. It should be noted that the steps illustrated in the flowchart of the accompanying drawings may be performed in a computer system such as a set of computer-executable instructions, and that, although the logical sequence is shown in the flowchart, in some cases, the steps illustrated or described may be performed in an order different from that described herein.

The method embodiments may be performed in a mobile terminal, a computer terminal, or a similar computing device. Taking running on the mobile terminal as an example, the mobile terminal may be smartphones (e.g., Android phones, iOS phones, etc.), tablet computers, PDAs, or terminal devices such as mobile internet devices (MIDs), PADs, and game consoles, etc. FIG. 1 is a block diagram of a hardware structure of a mobile terminal for a method for processing audio in a game according to an embodiment of the present disclosure. As shown in FIG. 1, the mobile terminal may include one or more (only one is shown in FIG. 1) processors 102 (the processor 102 may include, but is not limited to, a central processing unit (CPU), a graphics processing unit (GPU), a digital signal processing (DSP) chip, a microprocessing unit (MCU), a programmable logic device (FPGA), a neural network processing unit (NPU), a tensor processing unit (TPU), an artificial intelligence (AI)-type processor, etc.) and a memory 104 for storing data. In an embodiment, the above-described mobile terminal may further include a transmission device 106 for communication functions, an input/output device 108, and a display device 110. It can be understood by those ordinary skilled in the art that the structure illustrated in FIG. 1 is merely schematic, and it does not impose limitations on the structure of the above-described mobile terminal. For example, the mobile terminal may also include more or less components than shown in FIG. 1, or have a configuration different from that shown in FIG. 1.

The memory 104 may be used for storing a computer program, e.g., a software program and a module of an application software, such as the computer program corresponding to the method for processing audio in a game in the embodiments of the present disclosure. The processor 102, through running the computer program stored in the memory 104, performs various functional applications and data processing, i.e., achieves the above-described method for processing audio in a game. The memory 104 may include a high-speed random memory, and may also include a non-volatile memory, such as one or more magnetic storage devices, flash memories, or other non-volatile solid-state memories. In some examples, the memory 104 may also include memories remotely located relative to the processor 102, and these remote memories may be connected to the mobile terminal via a network. Examples of the network described above include, but are not limited to, the Internet, an enterprise intranet, a local area network, a mobile communication network, or combinations thereof.

The transmission device 106 is used for receiving or sending data via a network. Specific examples of the network described above may include a wireless network provided by a communication provider of the mobile terminal. In an example, the transmission device 106 includes a network interface controller (abbreviated as NIC) that may be connected to another network device via a base station and thus can communicate with the Internet. In an example, the transmission device 106 may be a radio frequency (abbreviated as RF) module that is used for communicating with the Internet wirelessly.

Input in the input/output device 108 may be from a plurality of human interface devices (abbreviated as HIDs). Examples include: keyboards and mice, gamepads, or other specialized game controllers (e.g., steering wheels, fishing rods, dancing blankets, remote controls, etc.). Some human interface devices may provide output functions in addition to input functions, e.g., force feedback and vibration of gamepads, audio output of controllers, etc.

The display device 110 may be, for example, a head-up display (HUD), a touch-screen-type liquid crystal display (LCD), or a touch display (also referred to as a "touch screen" or a "touch display screen"). The LCD may enable a user to interact with a user interface of the mobile terminal. In some embodiments, the above mobile terminal is provided with a graphical user interface (GUI), and the user may perform human-computer interaction with the GUI through finger contacts based on touching on the touch-sensitive surface and/or gestures, where the human-computer interaction function optionally includes the following interaction: creating a web page, drawing, word processing, creating an electronic document, gaming, videoconferencing, instant messaging, sending and receiving e-mails, communicating interface, playing a digital video, playing digital music, and/or web browsing, etc. Executable instructions for performing the above human-computer interaction function are configured/stored in a computer program product or a readable storage medium that is executable by one or more processors.

Figure 2:
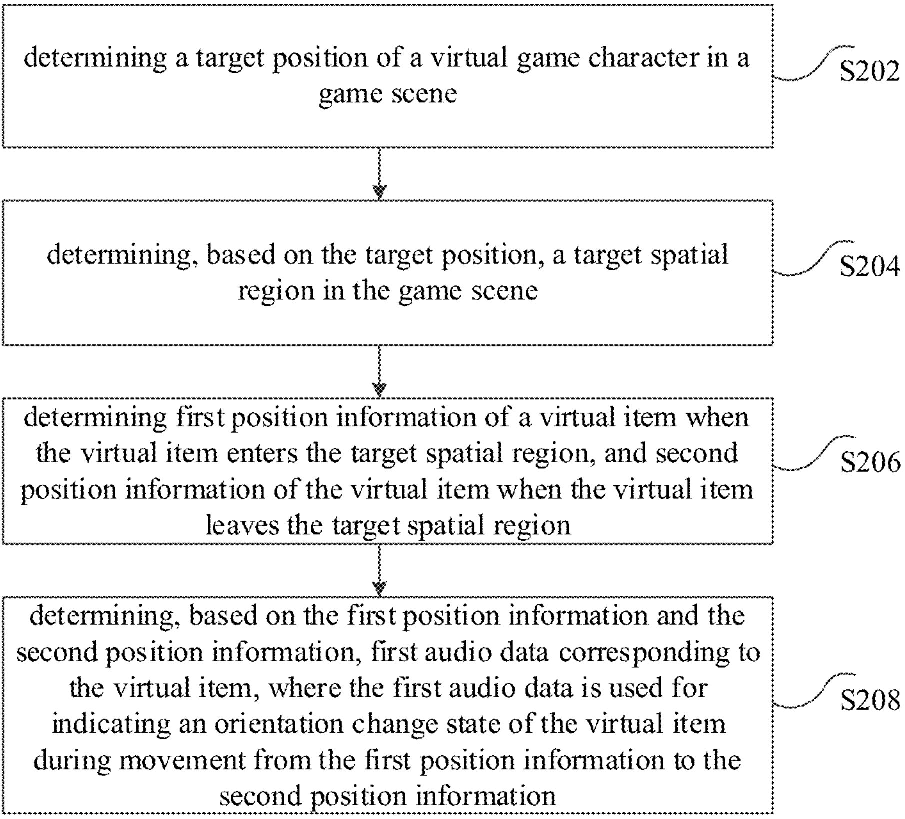
FIG. 2 is a flowchart of a method for processing audio in a game according to one embodiment of the present disclosure.

In this embodiment, a method for processing audio in a game run on the mobile terminal as described above is provided. FIG. 2 is a flowchart of a method for processing audio in a game according to one embodiment of the present disclosure. As shown in FIG. 2, the method includes the following steps S202 to S208.

At step S202, a target position of a virtual game character in a game scene is determined.

In the technical solution provided in the above step S202 of the present disclosure, the target position of the virtual game character in the game scene is determined, where the virtual game character may be a game object in the game scene, and the target position may be a position where the virtual game character is located.

At step S204, a target spatial region in the game scene is determined based on the target position.

In the technical solution provided in the above step S204 of the present disclosure, the target position of the virtual game character in the game scene is determined, and the target spatial region in the game scene is determined based on the target position, where the target spatial region may be a spatial region with coordinate information simulated with the virtual game character as the center, for example, a sphere-type space with coordinate information.

In an embodiment, the target position of the virtual game character in the game scene is determined, and a spatial region with coordinate information is simulated by using the target position where the virtual game character is located as the center.

At step S206, first position information of a virtual item when the virtual item enters the target spatial region, and second position information of the virtual item when the virtual item leaves the target spatial region are determined.

In the technical solution provided in the above step S204 of the present disclosure, a spatial region with coordinate information is simulated by using the target position where the virtual game character is located as the center, the first position information is generated when the virtual item enters the target spatial region, and the second position information is generated when the virtual item leaves the target spatial region. In some embodiments, the first position information may be a set of coordinate information represented as ($X_{entry}$, $Y_{entry}$, $Z_{entry}$); the second position information may be a set of coordinate information represented as ($X_{exit}$, $Y_{exit}$, $Z_{exit}$); and the virtual item may be a virtual equipment that needs to be provided with a movement sound effect such as a bullet, a dart, a grenade, or a missile, etc.

It should be noted that the above-described virtual item of this embodiment is not limited to the attacking-type equipment, but may also include other types of items in addition to the attacking-type equipment, for example, a mobile sound source, and the like, which is not specifically limited herein.

In an embodiment, when the virtual item passes through the target spatial region, the first position information and the second position information may be generated. The first position information is a coordinate of a point intersected with a surface of the target spatial region when the virtual item enters the target spatial region; and the second position information is a coordinate of a point intersected with the surface of the target spatial region when the virtual item leaves the target spatial region.

For example, when a bullet passes through the spherical target spatial region, two sets of coordinates may be generated, with one set of coordinates being coordinates of the intersection point between the bullet and the surface of the sphere when the bullet enters the sphere, and the other set of coordinates being coordinates of the intersection point between the bullet and the surface of the sphere when the bullet leaves the sphere. It may be set that the coordinates of the intersection point when the bullet enters the target spatial region are ($X_{entry}$, $Y_{entry}$, $Z_{entry}$), and the coordinates of the intersection point when the bullet leaves the target spatial region are ($X_{exit}$, $Y_{exit}$, $Z_{exit}$). When there is a listener at the center point of the sphere, the orientation thereof is facing the screen, and a radius of an audible range as set is 300, when the bullet is shot into the target spatial region, distances may be measured automatically to generate the first position information and the second position information. For example, if $X_{entry}$=290, $Y_{entry}$=12, $Z_{entry}$=−5, $X_{exit}$=−290, $Y_{exit}$=−13, $Z_{exit}$=10, then the first position information and the second position information are (290, 12, −5) and (−290, −13, 10) respectively.

At step S206, first audio data corresponding to the virtual item is determined based on the first position information and the second position information, where the first audio data is used for indicating an orientation change state of the virtual item during movement from the first position information to the second position information.

In the technical solution provided in the above step S206 of the present disclosure, when the virtual item passes through the target spatial region, the first position information and the second position information may be generated, the first position information and the second position information are sent to an audio engine, and the audio engine determines and plays, based on the first position information and the second position information, the first audio data corresponding to the virtual item, where the first audio data may be used for indicating the orientation change state of the virtual item during movement from the first position information to the second position information.

In an embodiment, the first audio data may be obtained by the audio engine through producing and editing the audio data, or may be selected from audio data purchased elsewhere. The audio engine may place a resource of the audio data into a project directory of a game engine through a plug-in, and when the game engine is running, the game engine retrieves the resource of the audio data from the project directory for playing, thereby obtaining the first audio data. The audio engine may also be set in the game engine, i.e., the game engine has the function of the audio engine; or the ready-made audio engine may be purchased from elsewhere, and is then associated with the game engine.

In an embodiment, when the virtual item passes through the target spatial region, the first position information and the second position information may be generated, the first position information and the second position information are sent to the audio engine, the first audio data corresponding to the process of passing through the first position information and the second position information is determined, and the first audio data is played.

In an embodiment, the first audio data may be a real-time control parameter (RTPC), which may be named as BulletWhoosh_Left_Right, BulletWhoosh_Front_Rear, BulletWhoosh_Up_Down. When a virtual item passes through the target spatial region, the corresponding first audio data is determined based on the first position information and the second position information.

For example, when a virtual item passes through the target spatial region, the real-time control parameter may generate the corresponding first audio data based on the first position information and the second position information, for example, BulletWhoosh_Left_Right generates $X_{entry}$ and $X_{exit}$, BulletWhoosh_Front_Rear generates $Y_{entry}$ and $Y_{exit}$, and BulletWhoosh_Up_Down generates $Z_{entry}$ and $Z_{exit}$.

At step S208, first audio data corresponding to the virtual item is determined based on the first position information and the second position information, where the first audio data is used for indicating an orientation change state of the virtual item during movement from the first position information to the second position information.

In the technical solution provided in the above step S208 of the present disclosure, the first audio data corresponding to the virtual item during the movement of the virtual item from the first position information to the second position information is determined based on the first position information when the virtual item enters the target spatial region and the second position information when the virtual item leaves the target spatial region as received.

In an embodiment, a real-time control parameter component for BulletWhoosh_Left_Right, BulletWhoosh_Front_Rear, and BulletWhoosh_Up_Down may be synchronously established in the audio engine, so that when a virtual item passes through the target spatial region, the real-time control parameter can generate a corresponding value and send it to the audio engine, and the audio engine receives the first position information and the second position information generated by the virtual item, and converts the first position information and the second position information as received into the corresponding first audio data, thereby achieving the purpose of determining the corresponding first audio data during the movement of the virtual item from the first position information to the second position information.

Through the above steps S202 to S208 of the present disclosure, the target position of the virtual game character in the game scene is determined, the target spatial region is determined in the game scene based on the target position, the first position information of the virtual item when the virtual item enters the target spatial region and the second position information of the virtual item when the virtual item leaves the target spatial region are determined, and the first audio data corresponding to the virtual item is determined based on the first position information and the second position information, where the first audio data is used for indicating the orientation change state of the virtual item during movement from the first position information to the second position information. In other words, the present disclosure obtains the orientation change state of the virtual item during the movement from the first position information to the second position information, and sends the first position information and the second position information to the audio engine, thereby enabling the audio engine to determine and play the first audio data corresponding to the virtual item. This enables an accurate orientation representation of the fly-past sound of the virtual item, and thus achieves the technical effect of improving audio playing effects in games and solves the technical problem of poor audio playing effects in games.

The above method of this embodiment is further described below.

As an optional embodiment, in step S206, determining the first position information of the virtual item when the virtual item enters the target spatial region, and the second position information of the virtual item when the virtual item leaves the target spatial region includes: determining an initial intersection point between a movement trajectory of the virtual item and the target spatial region, and determining position information, in the target spatial region, of the initial intersection point as the first position information; and determining a termination intersection point between the movement trajectory of the virtual item and the target spatial region, and determining position information, in the target spatial region, of the termination intersection point as the second position information.

In this embodiment, in the game engine, the initial intersection point between the movement trajectory of the virtual item and the target spatial region may be determined, and then the first position information is obtained by determining the position information of the initial intersection point in the target spatial region; the termination intersection point between the movement trajectory of the virtual item and the target spatial region is determined, and the second position information is obtained by determining the position information of the termination intersection point in the target spatial region. In some embodiments, the intersection point may be a certain point on the surface of the target spatial region, and each point has its corresponding coordinate. For example, if the target spatial region is a sphere, each point on the surface of the sphere is an intersection point with precise coordinates.

In an embodiment, the target spatial region is determined based on the target position of the virtual game character in the game scene, the first position information is obtained when the virtual item enters the target spatial region, and the second position information is obtained when the virtual item leaves the target spatial region.

In an embodiment, the first position information and the second position information may be converted into the real-time control parameter (RTPC), which may be named as BulletWhoosh_Left_Right, BulletWhoosh_Front_Rear, and BulletWhoosh_Up_Down. When a virtual item passes through the target spatial region, the real-time control parameter may generate a corresponding value and send it to the audio engine, and the audio engine receives the first position information of the virtual item when the virtual item enters the target spatial region and the second position information of the virtual item when the virtual item leaves the target spatial region.

As an optional embodiment, in step S208, determining, based on the first position information and the second position information, the first audio data corresponding to the virtual item includes: determining, in response to both the first position information and the second position information not exceeding a target threshold, the first audio data based on the first position information and the second position information.

In this embodiment, if neither the first position information nor the second position information exceeds the target threshold, the first audio data may be determined in the game engine based on the first position information and the second position information. In some embodiments, the target threshold may be a value set in accordance with the target spatial region, for example, when the target spatial region is a spherical region, the target threshold may be an audible radius of the spherical region.

In an embodiment, when both the first position information and the second position information in the game engine are within the target threshold, the first audio data is determined based on the first position information and the second position information. For example, when the bullet passes through the audible range, the first audio data (the bullet fly-past sound effect) is called and played during the movement of the bullet from the first position information (the intersection point where the bullet enters the audible range) and the second position information (the intersection point where the bullet leaves the audible range).

As an optional embodiment, the target spatial region is a spherical spatial region, and the method further includes: determining a radius of the spherical spatial region as the target threshold.

In this embodiment, the target spatial region may be spherical, and in the game engine, the radius of the spherical spatial region may be determined as the target threshold. In some embodiments, the target threshold may be represented as MAX.

As an optional embodiment, the radius of the spherical spatial region is adjusted in response to a first adjustment instruction.

In this embodiment, the first adjustment instruction may be performed on a setting interface of the game engine, and the radius of the spherical spatial region is adjusted in response to the first adjustment instruction. In some embodiments, the first adjustment instruction may adjust a magnitude of a parameter on the setting interface, and may be used for enlarging or reducing the radius of the spherical spatial region. The radius of the spherical spatial region may also be referred to as an audible radius.

In an embodiment, the first adjustment instruction is input on an input component for the audible radius of the setting interface, and the radius of the spherical spatial region is adjusted, in response to the first adjustment instruction, in accordance with the parameter input through the first adjustment instruction.

As an optional embodiment, in step S208, a first distance between a movement trajectory of the virtual item and the virtual game character is obtained; and determining, based on the first position information and the second position information, the first audio data corresponding to the virtual item includes: determining the first audio data based on the first position information, the second position information and the first distance.

In this embodiment, it may be that the audio engine receives the first distance between the movement trajectory of the virtual item and the virtual game character, and determines the first audio data based on the first position information, the second position information and the first distance.

In an embodiment, a real-time control parameter of the first distance may be synchronously established in a component of the audio engine for receiving the first distance in the game engine and determining the first audio data based on the first position information, the second position information and the first distance.

As an optional embodiment, in step S208, determining the first audio data based on the first position information, the second position information and the first distance includes: determining a first audio parameter corresponding to the first position information, the second position information and the first distance; and obtaining the first audio data by modulating a first audio sample based on the first audio parameter.

In this embodiment, in the audio engine, the first audio parameter corresponding to the first position information, the second position information and the first distance may be determined, and the first audio data may be obtained by modulating the first audio sample based on the first audio parameter. In some embodiments, the first audio parameter may be a real-time control parameter, and the first audio sample may be a sound sample selected from a database according to the actual situation.

In an embodiment, the first audio sample is associated with the first audio parameter in the audio engine, thereby achieving the modulating of the audio data.

In an embodiment, the first audio parameter may include the parameters of: BulletWhoosh_Left_Right, BulletWhoosh_Front_Rear, BulletWhoosh_Up_Down.

As an optional embodiment, determining the first audio parameter corresponding to the first position information, the second position information and the first distance includes: determining, based on a first coordinate of a first type in the first position information and a second coordinate of the first type in the second position information respectively, a corresponding left sound image parameter or a corresponding right sound image parameter; determining a corresponding audio filtering parameter based on a third coordinate of a second type in the first position information and a fourth coordinate of the second type in the second position information respectively; and determining a volume parameter based on the first distance.

In this embodiment, the first audio sample may be associated with the first audio parameter in the audio engine, which may be as follows: determining, based on the first coordinate of the first type in the first position information and the second coordinate of the first type in the second position information respectively, the corresponding left sound image parameter or the corresponding right sound image parameter; determining the corresponding audio filtering parameter based on the third coordinate of the second type in the first position information and the fourth coordinate of the second type in the second position information respectively; and determining the volume parameter based on the first distance. In some embodiments, the left sound image parameter or the right sound image parameter may be used for controlling the left-right channel gradation of the sound, which may be represented as Pan; the audio filtering parameter may be used for controlling the cut-off frequency band of the low-pass filter, which may be of a filtering effect that filters out the high frequency and allows only the low frequency to pass through, which may be represented as Low Pass; and the volume parameter may be used for controlling the volume, which may be represented as Volume.

In an embodiment, the first position information, the second position information and the first distance change constantly, and the audio parameters corresponding to the first position information, the second position information and the first distance also change constantly.

As an embodiment, in the audio engine, the first audio parameter is adjusted to a second audio parameter in response to a second adjustment instruction.

In this embodiment, in the audio engine, the first audio parameter may be flexibly adjusted according to the actual situation, thereby obtaining the second audio parameter after optimization.

As an embodiment, adjusting, in response to the second adjustment instruction, the first audio parameter to the second audio parameter includes: triggering the second adjustment instruction in response to the first audio sample being replaced with a second audio sample, and adjusting the first audio parameter to the second audio parameter; and obtaining second audio data by modulating the second audio sample based on the second audio parameter.

In this embodiment, in the audio engine, when the first audio sample is replaced with the second audio sample, the second adjustment instruction may be triggered, and the first audio parameter is adjusted to the second audio parameter; the second audio data is obtained by modulating the second audio sample based on the second audio parameter; and the second audio data is played.

In an embodiment, if the audio sample of the bullet fly-past sound is replaced, it is required to reconfirm whether the first audio parameter as set is appropriate, especially in the case where the length of the second audio sample is significantly different from the length of the first audio sample. The second audio data that conforms to the second audio sample is obtained by modulating the second audio sample based on the second audio parameter, and the second audio data is played.

As an embodiment, obtaining the first distance between the movement trajectory of the virtual item and the virtual game character includes: obtaining, by the audio engine, the first distance sent by the game engine; and determining the first audio data based on the first position information, the second position information and the first distance includes: obtaining, by the audio engine, the first position information and the second position information sent by the game engine, and determining, by the audio engine, the first audio data based on the first position information, the second position information and the first distance.

In this embodiment, in order to make the representation of the sound more realistic, the first distance between the movement trajectory of the virtual item and the virtual game character is obtained, the game engine sends the first position information, the second position information and the first distance to the audio engine, the audio engine obtains the first distance sent by the game engine, and the audio engine may determine the first audio data based on the first position information, the second position information and the first distance. In some embodiments, the first distance may be represented as BulletWhoosh_Distance, and may be a vertical distance between the movement trajectory of the virtual item and the virtual game character. The first distance does not require distinguishing between entry and exit, and is not a negative value. The movement trajectory of the virtual item may be the ballistic trajectory of the virtual item.

In an embodiment, in order to make the sound effect of the virtual item be affected by the vertical distance between the movement trajectory and the virtual game character, the first distance between the movement trajectory of the virtual item and the virtual game character is obtained, and the first position information, the second position information and the first distance are sent to the audio engine, thereby achieving the purpose that the smaller the first distance, the larger the volume, and the larger the first distance, the smaller the volume.

For example, in order to make the sound effect sound more realistic, it may be realized by letting the volume of the bullet fly-past sound be affected by the vertical distance between the ballistic trajectory and the listener, i.e., referencing the first distance, which is represented as BulletWhoosh_Distance on the interface. The first position information, the second position information and the first distance are sent to the audio engine, thereby achieving the purpose that the closer the ballistic trajectory is to the listener, the larger the volume, and conversely, the smaller the volume.

As an optional embodiment, in step S208, determining, based on the first position information and the second position information, the first audio data corresponding to the virtual item includes: sending, by the game engine based on a target interval time, the first position information and the second position information to the audio engine; and determining, by the audio engine, the first audio data based on the first position information and the second position information.

In this embodiment, the game engine may send, based on the target interval time, the first position information and the second position information to the audio engine. In some embodiments, the target interval time may be a time difference between the first position information and the second position information, and may be a time difference for gradually varying from an entry value to an exit value, which may be also referred to as a time for gradual varying. A magnitude of the target interval time may be set according to the actual situation.

In an embodiment, the first position information and the second position information are determined, and at the same time, the magnitude of the time for gradual varying that is set according to the actual situation is input in the component, in the game engine, of the time for gradual varying, thereby obtaining the target interval time for gradual varying from the first position information to the second position information. The game engine sends, based on the target interval time, the first position information and the second position information to the audio engine.

As an embodiment, the game engine obtains at least one piece of third position information between the first position information and the second position information. Sending, based on the target interval time, the first position information and the second position information to the audio engine includes: sending, by the game engine, the first position information, each piece of the third position information, and the second position information in sequence to the audio engine within the target interval time. Determining, by the audio engine, the first audio data based on the first position information and the second position information includes: determining, by the audio engine, the first audio data based on the first position information, each piece of the third position information, and the second position information, where the first audio data is used for playing audio with a gradually varied play state.

In this embodiment, the game engine obtains at least one piece of third position information between the first position information and the second position information, and sends the first position information, each piece of the third position information, and the second position information in sequence to the audio engine within the target interval time, thereby enabling that the first audio data played by the audio engine has a gradually varied play state, and achieving the purpose of sending, based on the target interval time, the first position information and the second position information to the audio engine.

As an embodiment, the game engine determines the target interval time and sends the target interval time to the audio engine; and the audio engine adjusts the target interval time in response to a third adjustment instruction and sends the target interval time as adjusted to the game engine.

In this embodiment, the game engine determines the target interval time and sends the target interval time to the audio engine; the audio engine receives the first position information and the second position information based on the target interval time. Based on the sample length corresponding to the first position information and the second position information, the audio engine responds to the third adjustment instruction, and the target interval time is subjected to the third adjustment instruction. The target interval time is adjusted in response to the third adjustment instruction.

In an embodiment, the third adjustment instruction may be an instruction for adjusting a parameter of the target interval time. Based on the adjustment of the second audio and repeated audiovisuals, an appropriate target interval time is adjusted.

As an embodiment, determining, based on the target position, the target spatial region in the game scene includes: determining, in the game scene, a target coordinate system with the target position as an origin; determining, in the target coordinate system, a spherical region centered on the origin with a second distance as a radius, where audio data is allowed to be played when a distance between the virtual item and the virtual game character is less than or equal to the second distance; and determining the spherical region as the target spatial region.

In this embodiment, based on the game engine, the target coordinate system with the target position as the origin may be determined in the game scene; and in the target coordinate system, the spherical region centered on the origin with the second distance as the radius is determined. In some embodiments, the target position may be a center point, and the coordinates of the target position may be (0,0,0); and the second distance may be a radius of an audible range of a sound.

As an embodiment, a first coordinate of a first type in the first position information and a second coordinate of the first type in the second position information are used for indicating a left direction or a right direction relative to the virtual game character; a third coordinate of a second type in the first position information and a fourth coordinate of the second type in the second position information are used for indicating a front direction or a rear direction relative to the virtual game character; and/or a fifth coordinate of a third type in the first position information and a sixth coordinate of the third type in the second position information are used for indicating an up direction or a down direction relative to the virtual game character.

In this embodiment, the first coordinate of the first type in the first position information and the second coordinate of the first type in the second position information are used for indicating the left direction or the right direction relative to the virtual game character, where the first coordinate of the first type may be represented as a left direction or a right direction relative to the virtual game character, and the first coordinate may be represented as $X_{entry}$; the second coordinate of the first type may be represented as a left direction or a right direction relative to the virtual game character, and the second coordinate may be represented as $X_{exit}$. The first position information and the second position information may be obtained through the game engine.

In an embodiment, the third coordinate of the second type in the first position information and the fourth coordinate of the second type in the second position information are used for indicating a front direction or a rear direction relative to the virtual game character, where the third coordinate of the second type may be represented as a $Y_{entry}$, and the fourth coordinate may be represented as $Y_{exit}$.

In an embodiment, the fifth coordinate of the third type in the first position information and the sixth coordinate of the third type in the second position information are used for indicating an up direction or a down direction relative to the virtual game character, where the fifth coordinate may be represented as $Z_{entry}$, and the sixth coordinate may be represented as $Z_{exit}$.

In an embodiment, the first coordinate of the first type in the first position information and the second coordinate of the first type in the second position information are mandatory to be used, and the other directions are selectable according to the actual situation, i.e., for the third coordinate of the second type in the first position information, the fourth coordinate of the second type in the second position information, the fifth coordinate of the third type in the first position information, and the sixth coordinate of the third type in the second position information, the required direction coordinate may be selected according to the actual situation.

In this embodiment, the target position of the virtual game character in the game scene is determined, the target spatial region is determined in the game scene based on the target position, the first position information of the virtual item when the virtual item enters the target spatial region and the second position information of the virtual item when the virtual item leaves the target spatial region are determined, and the first audio data corresponding to the virtual item is determined based on the first position information and the second position information, where the first audio data is used for indicating the orientation change state of the virtual item during the movement from the first position information to the second position information. In other words, the present disclosure obtains the orientation change state of the virtual item during the movement from the first position information to the second position information, and sends the first position information and the second position information to the audio engine, thereby enabling the audio engine to determine and play the first audio data corresponding to the virtual item. This enables an accurate orientation representation of the fly-past sound of the virtual item, and thus achieves the technical effect of improving audio playing effects in games and solves the technical problem of poor audio playing effects in games.

The following provides further examples and introductions for the technical solutions of the embodiments of the present disclosure in combination with the preferred embodiments. Specifically, the description is performed by using the virtual auxiliary attacking equipment as a bullet.

The bullet fly-past sound effect refers to the very short "swoosh" sound heard by a human ear when a firearm fires and the bullet rapidly flies past near the ear, which is a part of a complete set of firing sound effects in the first-person shooter game and the third-person shooter game. Good bullet fly-past sound effects, in the artistic representation aspect, help enhance realism sense and spatial sense and highlight artistic details, and in the functional representation aspect, assist players in perceiving threats, and players can further judge their own situation by combining other sounds and prompt information in the matchup.

Currently, the production of the game is increasingly refined and of high quality. Game sound workers should make full use of every opportunity to make a sound, thereby conveying as much useful information as possible through the sound and presenting more pleasant effects. However, traditional bullet fly-past sound effects have deficiencies in both the artistic representation and the functional representation aspects.

For artistic and functional considerations, the representation of the bullet fly-past sound effect in the game needs to be exaggerated. However, according to factors such as the flying speed of the bullet, the volume of the bullet, and the acoustic principle of the bullet fly-past sound, it can be ascertained that the bullet fly-past sound in reality has a very fast speed and a very small volume, and that even if the bullet passes over the shoulder, the audible duration of the bullet fly-past sound is very short, and even difficult to be detected under the cover of the firing sound, so the bullet fly-past sound can't be perceived well by the user. At the same time, it is not feasible to deal with the bullet fly-past sound effect in a similar way as dealing with "a car passing by a listener with a sound of an engine", which may be more realistic, but due to the flying speed of the bullet being too fast, it will be difficult to control the sound representation within the range that conforms to the artistic representation and the functional representation. In addition, such rapid movement often needs to be accompanied by an effect of a Doppler effect to increase the realism sense, which will increase the difficulty of the work, and in consideration of the current performance of the computer and the performance of the game engine, the refreshing speed of the game engine is unable to keep up with the speed of the bullet movement, and therefore this processing method cannot be realized.

In the related art, the bullet fly-past sound effect is usually achieved by means of "simulation", where the bullet fly-past sound effect is achieved by fictionalizing a triggering condition based on the formation of the ballistic trajectory of the bullet, and by simulating a situation of the bullet flying past nearby, i.e., whenever the ballistic trajectory intersects with an edge of an artificially set "audible range of the bullet fly-past sound effect", the game engine may report to the audio engine that it is time to play the bullet fly-past sound, and where should this sound be played.

Figure 3:
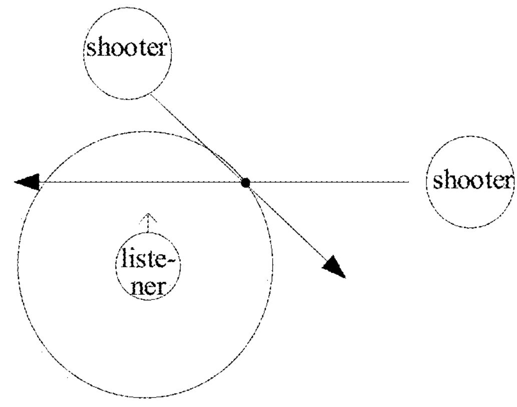
FIG. 3 is a schematic diagram of triggering of a bullet fly-past sound effect according to related art I.

FIG. 3 is a schematic diagram of triggering of a bullet fly-past sound effect according to related art I. As shown in FIG. 3, the black circle is the audible range of the bullet fly-past sound effect, the horizontal line with an arrow indicates the ballistic trajectory of the shooter's shot, and the place where the two ballistic trajectories intersect is an intersection point. Whenever the "intersection point" is generated, the time for "playing the bullet fly-past sound" may be triggered, and at the same time, the position information of the intersection point may be sent to the audio engine. Finally, a bullet fly-past sound with a fixed position information may be heard, where the position information is fixed and unchanged after the intersection point is generated. In terms of hearing impression, this "position" may be obvious or completely absent, depending on the stereo sound effect mixing ratio set in the audio engine.

Figure 4:
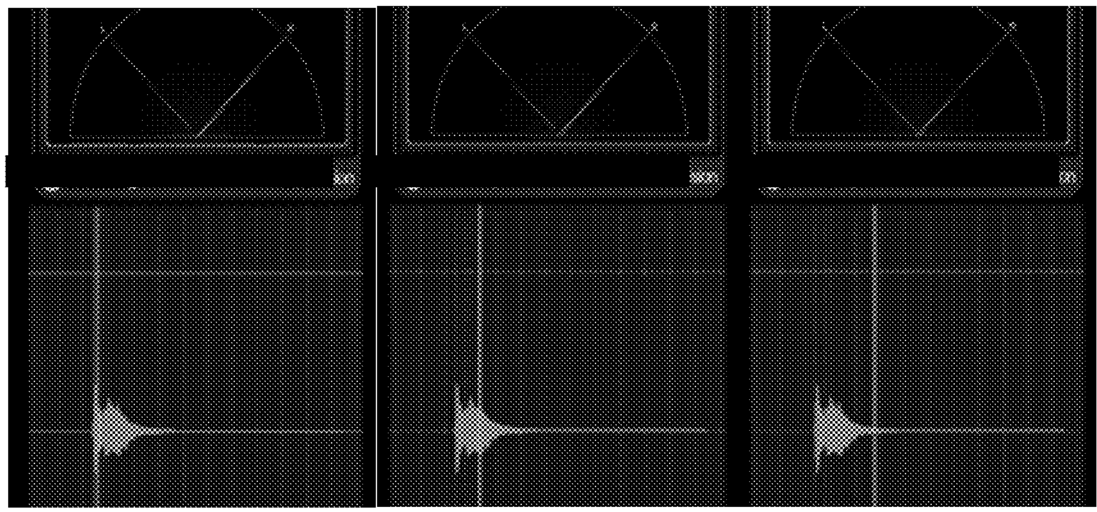
FIG. 4 is a schematic diagram of a waveform and a sound image table of a bullet fly-past sound effect according to related art I.

However, in the above method, from the viewpoint of the function of the bullet fly-past sound effect, the same intersection point may correspond to a plurality of ballistic trajectories. For example, the two shooters in FIG. 3 have very different orientations, but the positions of the bullet fly-past sounds are all at the intersection point, which makes the bullet fly-past sound not have the function of assisting in judging the orientation, and is sometimes more prone to generate misdirection, causing that the tactical information finally obtained from the bullet fly-past sound is only "someone is shooting at me", and it is not possible to further assist in judging "which direction the bullet comes from" through the bullet fly-past sound effect; from the viewpoint of the artistic representation of the bullet fly-past sound effect, FIG. 4 is a schematic diagram of a waveform and a sound image table of a bullet fly-past sound effect according to related art I. As shown in FIG. 4, only the right channel has the sound in the whole sound emitting process of the head, middle and tail of the sound, and the left and right channels of a few processes may emit the sound at the same time with different ratios, but the sound does not have further sound image changes; the bullet should be in motion during the bullet fly-past process, and the manner of playing the bullet fly-past sound effect at a fixed position is not enough to reflect the movement of the bullet, which results in that the sound does not have a good spatial sense, is not realistic and pleasant enough, and does not fully create a realistic sense and tense sense atmosphere during battles in the game.

It is very easy to realize such a sound representation through linear editing in film and television works, and it is only required to control in the digital audio workstation, by drawing automation control information (Automation) line segments based on the image representation and the plot setting, the left-right sound image parameter (Pan) of the stereo audio of the bullet fly-past sound. It should be noted that there is interactivity in the game, and the line segment is non-linear, so we can't pre-determine where the "start point and terminate point" of the automation control information line segment are, and we need to use some methods to obtain the "start point and terminate point" information from the ballistic trajectory generated in real time, and let the "start point and terminate point" information have an effect on the bullet fly-past sound in real time.

In other words, if the game engine can be made to send the "start point and terminate point" information to the audio engine, and then the audio engine sets the effect of the "start point and terminate point" information on the parameter of the bullet fly-past sound sample, the desired effect can be achieved. The "start point and terminate point" information needs to be capable of being recognized and used by the audio engine as a "control source" in the form of a numerical value, and the control information in the audio engine is very suitable for conveying the "start point and terminate point" information, so the "start point and terminate point" information is converted into a real-time control parameter in the audio engine to control the left-right sound image parameter, the volume, the low pass filtering, or any other parameter desired to be varied in real time of the bullet fly-past sound sample.

Figure 5:
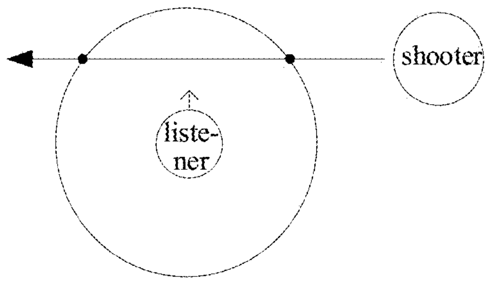
FIG. 5 is a schematic diagram of triggering of a bullet fly-past sound effect according to one embodiment of the present disclosure.

FIG. 5 is a schematic diagram of triggering of a bullet fly-past sound effect according to one embodiment of the present disclosure. As shown in FIG. 5, the outermost circle indicates the audible range of the sound, and the orientation change of the bullet fly-past sound is determined by the coordinates of the two intersection points, namely the intersection point for entry and the intersection point for exit. In this way, each ballistic trajectory corresponds to only one unique shooter direction, as shown by the line with an arrow in FIG. 5.

Figure 6:
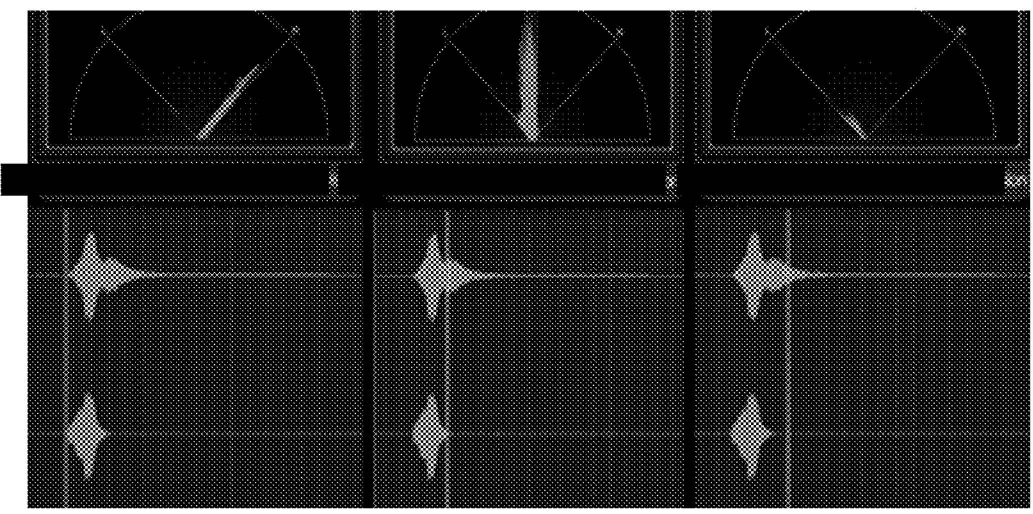
FIG. 6 is a schematic diagram of a waveform and a sound image table of a bullet fly-past sound effect when an enemy fires from the due right to the due left according to one embodiment of the present disclosure.

FIG. 6 is a schematic diagram of a waveform and a sound image table of a bullet fly-past sound effect when an enemy fires from the due right to the due left according to one embodiment of the present disclosure. As shown in FIG. 6, it can be finally achieved that the volume of the left and right channels in the entire sound emitting process is gradually varied, and as can also be seen in the sound image table of the head, middle and tail of the sound, a sound that moves from the right to the left can be obtained.

The above method of this embodiment is further described below.

Figure 7:
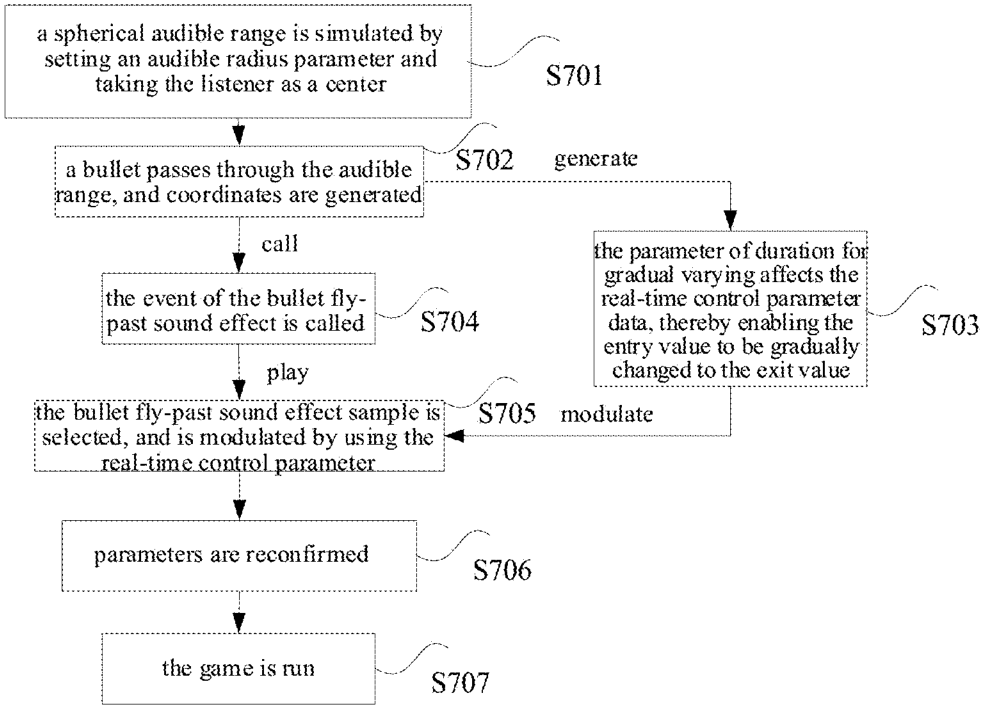
FIG. 7 is a flowchart of a method for processing audio in a game according to one embodiment of the present disclosure.

FIG. 7 is a flowchart of a method for processing audio in a game according to one embodiment of the present disclosure. As shown in FIG. 7, the method may include the following steps S701 to S707.

At step S701, a spherical audible range is simulated by setting an audible radius parameter and taking the listener as a center.

In an embodiment, in the game engine, with the listener as the center, a coordinate system is simulated, and the audible radius of the bullet fly-past sound is set. This audible radius parameter is to be exposed to the game engine for debugging. FIG. 8 is a schematic diagram of adjustment parameters according to one embodiment of the present disclosure. As shown in FIG. 8, the audible radius parameter and the parameter of duration for gradual varying may be set, where the left-right, front-rear, and up-down correspond to X-axis, Y-axis, and Z-axis of the coordinate axis respectively, the coordinates of the center point are (0,0,0), the right side, front side and up side of the listener are represented by positive numbers, the left side, rear side and down side of the listener are represented by negative numbers, and the unit of the coordinate may be the same as the distance unit as set.

In an embodiment, the distance unit may be set according to actual needs, and may be understood as the correspondence between the coordinate in the game scene and the real unit. For example, 175 represents 175 centimeters in reality, and 175 in other items perhaps may correspond to 175 millimeters, 175 light-years, and so on. Theoretically, it is possible to use any number in the game to represent any number in reality, for example, using 3 to represent 5 centimeters in reality, but this is often not done as it is more cumbersome to think about and convert. Therefore, for ease of communication, various functional modules need to be made uniform, e.g., (−123, 0, 0) would ideally represent 123 centimeters on the due left side of the listener, rather than 123 meters or 246 millimeters.

In an embodiment, a spherical "audible range of the bullet fly-past sound" centered on the listener is simulated. FIG. 9 is a schematic diagram of a spherical audible range with coordinate information on a surface according to one embodiment of the present disclosure. As shown in FIG. 9, each point on the surface of the sphere can be represented by precise coordinates.

At step S702, a bullet passes through the audible range, and coordinates are generated.

In this embodiment, when a bullet passes through the "sphere" in the game engine, two sets of coordinates may be generated, with one set of coordinates being the intersection point between the bullet and the surface of the sphere when the bullet enters the sphere, and the other set of coordinates being the intersection point between the bullet and the surface of the sphere when the bullet leaves the sphere. The coordinates for entry are set as ($X_{entry}$, Y entry, $Z_{entry}$), and the coordinates for leaving are set as ($X_{exit}$, $Y_{exit}$, $Z_{exit}$).

For example, if there is a listener at the center point of the sphere, the orientation thereof is facing the screen, and the radius of the audible range is set as 300 (equivalent to 3 meters in the game scene), then the coordinate information generated by this ballistic trajectory may be: $X_{entry}=290$, $Y_{entry}=12$, $Z_{entry}=-5$, $X_{exit}=-290$, $Y_{exit}=-13$, $Z_{exit}=10$.

At step S703, the parameter of duration for gradual varying affects the real-time control parameter data, thereby enabling the entry value to be gradually changed to the exit value.

In this embodiment, in the game engine, the coordinates of the X-axis, the Y-axis and the Z-axis are converted into three sets of real-time control parameter (RTPC) data respectively, which may be named, for example, BulletWhoosh_Left_Right, BulletWhoosh_Front_Rear, and BulletWhoosh_Up_Down.

In an embodiment, whenever a bullet passes through the "audible range", these three sets of real-time control parameters may simultaneously generate six values and send them to the audio engine, and the six values include: BulletWhoosh_Left_Right: $X_{entry}$, $X_{exit}$; BulletWhoosh_Front_Rear: $Y_{entry}$, $Y_{exit}$; and BulletWhoosh_Up_Down: $Z_{entry}$, $Z_{exit}$.

In an embodiment, at this time, the entry value and the exit value are sent to the audio engine simultaneously, and a time difference between the entry value and the exit value needs to be set, where the entry value is gradually changed to the exit value. Therefore, a "time for gradual varying" is added to the real-time control parameter, and this parameter is exposed to the game engine, as shown in FIG. 8, which may be debugged according to the actual situation.

In an embodiment, in order to make the representation more realistic, a real-time control parameter needs to be added, which is used for making the volume of the bullet fly-past sound affected by the vertical distance between the ballistic trajectory and the listener. The closer the ballistic trajectory is to the listener, the larger the volume, and conversely, the smaller the volume. Therefore, the "vertical distance between the ballistic trajectory and the listener" is referenced, which does not require distinguishing between entry and exit and is not a negative value, and may be named as BulletWhoosh_Distance.

At step S704, the event of the bullet fly-past sound effect is called.

In this embodiment, it is also required for the game engine to call the event of "playing the bullet fly-past sound effect" in the audio engine when the bullet passes through the "audible range" in the game engine.

In summary, what needs to be done at the program side is that whenever a bullet passes through the "audible range", the game engine will call the event of "playing the bullet fly-past sound effect", and at the same time send a total of seven values of four sets of real-time control parameters to the audio engine, where three sets of real-time control parameters are provided with gradual varying.

Firstly, it should be clarified that although real-time control parameters in the three directions, i.e., left-right, front-rear, and up-down, have been made at the program side, not all of these three are necessary to be used, just for reserving sufficient methods for further optimization, expansion and adaptation to different projects. For example, in rare cases where there is a large height difference between the two sides that fight against with each other, the real-time control parameter of BulletWhoosh_Up_Down may be omitted; or in stereo environments where there are no very effective audio parameters to distinguish between up and down, the real-time control parameter of BulletWhoosh_Up_Down may also be omitted.

However, the real-time control parameter in the left-right direction is necessary, and shows the most significant effect, so any project using this scheme at least uses the left-right RTPC.

The following is a further description of relevant configurations that use the left-right real-time control parameter, and the front-rear real-time control parameter.

At step S705, the bullet fly-past sound effect sample is selected, and is modulated by using the real-time control parameter.

In this embodiment, FIG. 10 is a schematic diagram of establishing real-time control parameters and setting attributes according to one embodiment of the present disclosure. As shown in FIG. 10, three real-time control parameters, i.e., BulletWhoosh_Left_Right, BulletWhoosh_Front_Rear, and BulletWhoosh_Distance, are established in the Game Syncs of the audio engine (the up-down real-time control parameter has been discarded here), and the range values of the real-time control parameters are set to match the "audible radius", for example, the "audible radius" is 300 centimeters, the left-right and front-rear may be set to be in the range of −300 to 300, and the distance may be set to be in the range of 0 to 300. The default value may be any numerical value.

In an embodiment, the default value may be a basic attribute that needs to be filled in to establish a real-time control parameter in the audio engine. When the audio engine does not receive the value of the real-time control parameter, it may execute according to the default value. If the program operates normally, the audio engine should receive the value given by the game engine at each trigger, and the default value will not be triggered. However, to prevent frame loss caused by buffering, as shown in FIG. 10, a middle value may be filled in as the default value.

Figure 11B:
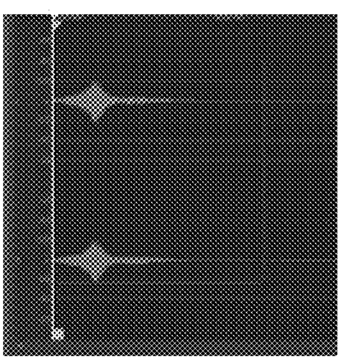
FIG. 11(*a*) is a schematic diagram of selection and basic settings of a bullet fly-past sound effect sample according to one embodiment of the present disclosure.

In an embodiment, the selection and basic settings of the bullet fly-past sound effect sample in the audio engine may be done by using mono samples, and if stereo samples are used, do not use the ones that have their own sound image variations or those that have significant differences between left and right channels. Since this is a "pseudo three-dimensional (3D)" method, the positioning attribute (Positioning) of the sample should be set to be two-dimensional (2D), and the Speaker Panning should be set as the Balance-Fade mode. FIG. 11(*a*) is a schematic diagram of selection and basic settings of a bullet fly-past sound effect sample according to one embodiment of the present disclosure. As shown in FIG. 11(*a*), the positioning attribute and the waveform of the sample are set, and the Balance-Fade mode is selected. It should be noted that if there are a plurality of random samples, it is necessary to ensure that the lengths and dynamic changes of these samples are as close to each other as possible, so that they can jointly fit into the same set of "duration for gradual varying" parameters. In addition, the longer the length of the sample, the easier the left-right changes will be perceived. FIG. 11(*b*) is a schematic diagram of a waveform of a bullet fly-past sound effect sample according to one embodiment of the present disclosure. As shown in FIG. 11(*b*), by making the above settings for the sound sample of the object selected for the bullet fly-past sound effect, the waveform of the sound sample for the bullet fly-past sound effect may be obtained as shown in FIG. 11(*b*).

In an embodiment, only in the Balance-Fade mode can the sample be associated with the real-time control parameter, and only by associating the sample with the real-time control parameter, can the left-right sound image parameter of the stereo audio be used as the target for modulation.

Figure 12:
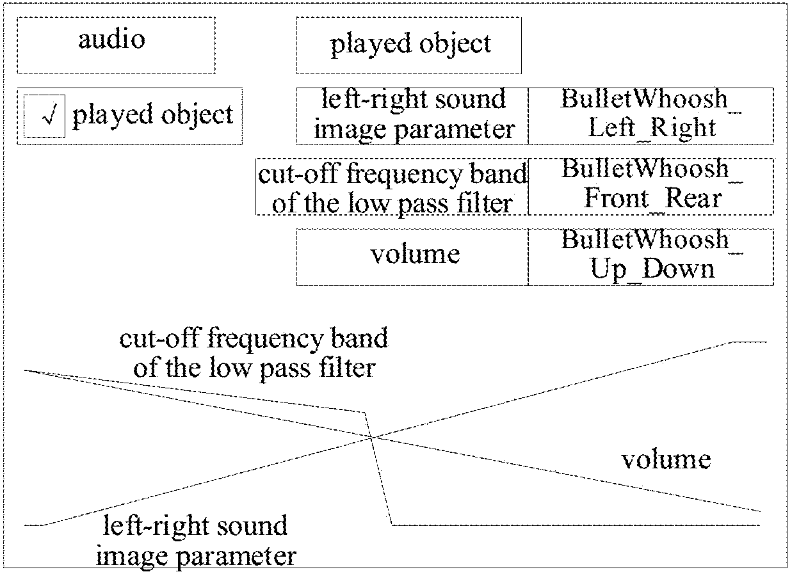
FIG. 12 is a schematic diagram of associating a sample with a real-time control parameter according to one embodiment of the present disclosure.

FIG. 12 is a schematic diagram of associating a sample with a real-time control parameter according to one embodiment of the present disclosure. As shown in FIG. 12, setting is performed in the real-time control parameter tab of a bullet fly-past sound played object. The left-right sound image parameter, the cut-off frequency band of the low pass filter, and the volume level parameter of the played object are set as modulation targets respectively, then the BulletWhoosh_Left_Right, the BulletWhoosh_Front_Rear, and the vertical distance between the ballistic trajectory and the listener are set as modulation sources respectively, and finally a curve of the degree of influence of the real-time control parameter value on the parameter is set. In some embodiments, for the cut-off frequency band of the low pass filter, the greater the value, the more obvious the degree of "filtering". The BulletWhoosh_Left_Right controls the left-right sound image parameter of the stereo audio, and plays a role in enabling the listener to hear the left-right channel gradation of the sound when the bullet flies in the left-right direction. The BulletWhoosh_Front_Rear controls the cut-off frequency band of the low pass filtering effect. The vertical distance between the ballistic trajectory and the listener controls the volume, so that the closer the ballistic trajectory is to the listener, the larger the volume.

In an embodiment, the above settings can achieve that there is no effect on the front of the listener, and there is a more obvious but less affected by the distance change effect on the rear. When the bullet is flying from front to rear, the sound may "change from bright to muffled", and when the bullet is flying from rear to front, the sound may "change from muffled to bright". In some embodiments, it is not necessary to use the low pass filtering effect to represent the front and rear, and other effects may be replaced or combined. Here, it can be flexibly processed. These parameter curves are varied as shown in FIG. 12, and specifically, they can still be flexibly adjusted according to actual needs and continuously optimized based on hearing impression.

In an embodiment, when the shot is oblique, the above two real-time control parameters act simultaneously.

At step S706, parameters are reconfirmed.

The game engine has pre-exposed two parameters, namely the "audible radius" and the "duration for gradual varying". The debugging of the audible radius needs to be performed together in combination with the debugging of the real-time control parameter. The parameter of duration for gradual varying needs to be repeatedly debugged to an optimal balance point based on the sample length, the real-time control parameter curve, and the measured hearing impression, and if the audio sample of the bullet fly-past sound is replaced, it is often required to reconfirm whether this parameter is appropriate, especially when the length of the new audio sample is significantly different from before.

At step S707, the game is run.

The game is run to feel the effect, during which the sound parameter in the audio engine may be constantly and carefully adjusted and optimized until the sound effect in the game engine reaches the most appropriate effect.

In order to improve both the functional representation and the artistic representation of the bullet fly-past sound effect, the present disclosure provides a method of "making the bullet fly-past sound sounds as if it is moving according to the flying path of the bullet", i.e., making the bullet fly-past sound have a precise orientation representation. For example, whenever the bullet flies from my right side to my left side, we will hear that the first half of the sound sample in time is in the right channel, and the second half is in the left channel, and that this process is gradually varied, which matches the movement trajectory of the bullet.

Through the above steps, the basic information and data necessary to achieve the final effect is provided, and the basic data is converted into real-time control parameters that can be used directly by the audio engine. The way of obtaining and using the real-time control parameter data is the most important and ingenious part of this embodiment, so that a close association between the parameter of the sound and the context in the game can be established in the audio engine in the next step, and then the target effect can be achieved through the debugging and optimization of the parameter, thereby enabling the player to intuitively feel the flight trajectory of the bullet through the bullet fly-past sound effect. This embodiment retains the basic functions of "perceiving threat" and "enhancing the sense of presence" of the bullet fly-past sound effect in the original scheme, and on this basis, further significantly improves the hearing impression, and at the same time additionally confers the function of assisting in judging the orientation of the shooter, which has never been done before in any game project, to the bullet fly-past sound effect. This finally improves the artistic representation and functional representation in a comprehensive way.

The embodiment simulates a coordinate system with the listener as the center, and sets the audible radius of the bullet fly-past sound, thereby obtaining a spherical audible range of the bullet fly-past sound with the listener as the center; when the bullet passes through the sphere, two sets of coordinates may be generated, and at the same time, the game engine calls the audio of "playing the bullet fly-past sound effect", and converts the coordinate information into RTPC parameters and sends them to the audio engine for identification and use; the game engine associates the two sets of coordinate information with the audio information, thereby realizing debugging of the audio sample based on the coordinate information, thus solving the technical problem of poor sound effects in games and achieving the technical effect of improving the poor sound effects in games.

The embodiment also lays the foundation for real-time modulation of other sound parameters in the audio engine that are expected to be influenced by the bullet flight trajectory, and has strong scalability and evolvability. For example, this set of solutions is actually also very suitable for multi-channel sound systems, and if it is applied to the project of Dolby Atmos in the future, using the front-rear real-time control parameter to control the front-rear sound image, and using the up-down real-time control parameter to control the up-down sound image may enable this set of solutions further realize its value, and at the same time, the advantages of multi-channel game audio systems will be more fully utilized.

The embodiments of the present disclosure also provide an apparatus for processing audio in a game. The apparatus is used for implementing the above embodiments and preferred embodiments, and those that have already been described will not be repeated. As used hereinafter, the term "unit" may be a combination of software and/or hardware that implements a preset function. Although the apparatus described in the following embodiments is preferably implemented in software, implementation in hardware, or a combination of software and hardware, is also possible and contemplated.

Figure 13:
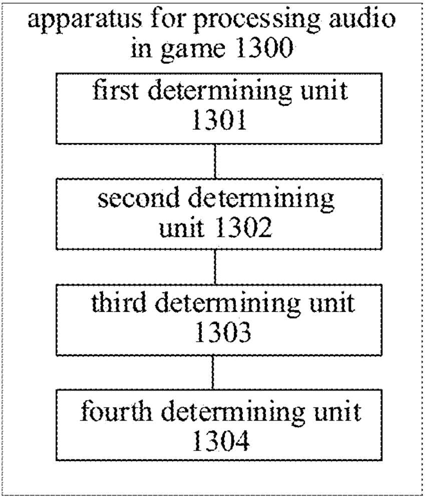
FIG. 13 is a block diagram of a structure of an apparatus for processing audio in a game according to one embodiment of the present disclosure.

FIG. 13 is a block diagram of a structure of an apparatus for processing audio in a game according to an embodiment of the present disclosure. As shown in FIG. 13, the apparatus 1300 for processing audio in a game may include a first determining unit 1301, a second determining unit 1302, a third determining unit 1303, and a fourth determining unit 1304.

The first determining unit 1301 is configured to determine a target position of a virtual game character in a game scene.

The second determining unit 1302 is configured to determine, based on the target position, a target spatial region in the game scene.

The third determining unit 1303 is configured to determine first position information of a virtual item when the virtual item enters the target spatial region, and second position information of the virtual item when the virtual item leaves the target spatial region.

The fourth determining unit 1304 is configured to determine, based on the first position information and the second position information, first audio data corresponding to the virtual item, where the first audio data is used for indicating an orientation change state of the virtual item during movement from the first position information to the second position information.

The third determining unit 1303 is configured to: determine an initial intersection point between a movement trajectory of the virtual item and the target spatial region, and determine position information, in the target spatial region, of the initial intersection point as the first position information; and determine a termination intersection point between the movement trajectory of the virtual item and the target spatial region, and determine position information, in the target spatial region, of the termination intersection point as the second position information.

The fourth determining unit 1304 is configured to: determine, in response to both the first position information and the second position information not exceeding a target threshold, the first audio data based on the first position information and the second position information.

The fourth determining unit 1304 is configured to determine a radius of a spherical spatial region as the target threshold, where the target spatial region is the spherical spatial region.

The fourth determining unit 1304 is configured to adjust the radius of the spherical spatial region in response to a first adjustment instruction.

The fourth determining unit 1304 is configured to: obtain a first distance between a movement trajectory of the virtual item and the virtual game character; and determine the first audio data based on the first position information, the second position information and the first distance.

The fourth determining unit 1304 is configured to: determine a first audio parameter corresponding to the first position information, the second position information and the first distance; and obtain the first audio data by modulating a first audio sample based on the first audio parameter.

The fourth determining unit 1304 is configured to: determine, based on a first coordinate of a first type in the first position information and a second coordinate of the first type in the second position information respectively, a corresponding left sound image parameter or a corresponding right sound image parameter; determine a corresponding audio filtering parameter based on a third coordinate of a second type in the first position information and a fourth coordinate of the second type in the second position information respectively; and determine a volume parameter based on the first distance.

The fourth determining unit 1304 is configured to adjust, in response to a second adjustment instruction, the first audio parameter to a second audio parameter.

The fourth determining unit 1304 is configured to: trigger the second adjustment instruction in response to the first audio sample being replaced with a second audio sample, and adjust the first audio parameter to the second audio parameter; and obtain second audio data by modulating the second audio sample based on the second audio parameter.

In an embodiment, an audio engine obtains the first distance sent by a game engine; and the audio engine obtains the first position information and the second position information sent by the game engine, and determines the first audio data based on the first position information, the second position information and the first distance.

In an embodiment, the game engine sends, based on a target interval time, the first position information and the second position information to the audio engine; and the audio engine determines the first audio data based on the first position information and the second position information.

In an embodiment, the game engine obtains at least one piece of third position information between the first position information and the second position information; the game engine sends the first position information, each piece of the third position information, and the second position information in sequence to the audio engine within the target interval time; and the audio engine determines the first audio data based on the first position information, each piece of the third position information, and the second position information, where the first audio data is used for playing audio with a gradually varied play state.

In an embodiment, the game engine determines the target interval time, and sends the target interval time to the audio engine; and the audio engine adjusts the target interval time in response to a third adjustment instruction, and sends the target interval time as adjusted to the game engine.

The second determining unit 1302 is configured to: determine, in the game scene, a target coordinate system with the target position as an origin; determine, in the target coordinate system, a spherical region centered on the origin with a second distance as a radius, where audio data is allowed to be played when a distance between the virtual item and the virtual game character is less than or equal to the second distance; and determine the spherical region as the target spatial region.

In an embodiment, a first coordinate of a first type in the first position information and a second coordinate of the first type in the second position information are used for indicating a left direction or a right direction relative to the virtual game character; a third coordinate of a second type in the first position information and a fourth coordinate of the second type in the second position information are used for indicating a front direction or a rear direction relative to the virtual game character; and/or a fifth coordinate of a third type in the first position information and a sixth coordinate of the third type in the second position information are used for indicating an up direction or a down direction relative to the virtual game character.

In this embodiment, the target position of the virtual game character in the game scene is determined through the first determining unit, the target spatial region is determined in the game scene based on the target position through the second determining unit; the first position information of the virtual item when the virtual item enters the target spatial region and the second position information of the virtual item when the virtual item leaves the target spatial region are determined through the third determining unit; and the first audio data corresponding to the virtual item is determined based on the first position information and the second position information through the fourth determining unit, where the first audio data is used for indicating the orientation change state of the virtual item during the movement from the first position information to the second position information. In other words, the present disclosure obtains the orientation change state of the virtual item during the movement from the first position information to the second position information, and sends the first position information and the second position information to the audio engine, thereby enabling the audio engine to determine and play the first audio data corresponding to the virtual item. This enables an accurate orientation representation of the fly-past sound of the virtual item, and thus achieves the technical effect of improving audio playing effects in games and solves the technical problem of poor audio playing effects in games.

It should be noted that each of the above units may be implemented through software or hardware. For the latter, the following methods, but not limited thereto, may be used for implementation: the above units are all located in the same processor; alternatively, the above units are located in different processors in any combination.

The embodiments of the present disclosure also provide a computer-readable storage medium. The computer-readable storage medium stores a computer program, where the computer program is set to perform, when run by a processor, the method for processing audio in a game in the embodiments of the present disclosure.

In an embodiment, in this embodiment, the computer-readable storage medium described above may be set to store a computer program used for executing the following steps S1 to S4.

At step S1, a target position of a virtual game character in a game scene is determined.

At step S2, a target spatial region in the game scene is determined based on the target position.

At step S3, first position information of a virtual item when the virtual item enters the target spatial region, and second position information of the virtual item when the virtual item leaves the target spatial region are determined.

At step S4, first audio data corresponding to the virtual item is determined based on the first position information and the second position information, where the first audio data is used for indicating an orientation change state of the virtual item during movement from the first position information to the second position information.

The computer-readable storage medium described above may also be set to store a computer program used for executing the following steps:

determining an initial intersection point between a movement trajectory of the virtual item and the target spatial region, and determining position information, in the target spatial region, of the initial intersection point as the first position information; and determining a termination intersection point between the movement trajectory of the virtual item and the target spatial region, and determining position information, in the target spatial region, of the termination intersection point as the second position information;

determining, in response to both the first position information and the second position information not exceeding a target threshold, the first audio data based on the first position information and the second position information;

determining a radius of a spherical spatial region as the target threshold, where the target spatial region is the spherical spatial region;

adjusting the radius of the spherical spatial region in response to a first adjustment instruction;

obtaining a first distance between a movement trajectory of the virtual item and the virtual game character; and determining the first audio data based on the first position information, the second position information and the first distance;

determining a first audio parameter corresponding to the first position information, the second position information and the first distance; and obtaining the first audio data by modulating a first audio sample based on the first audio parameter;

determining, based on a first coordinate of a first type in the first position information and a second coordinate of the first type in the second position information respectively, a corresponding left sound image parameter or a corresponding right sound image parameter; determining a corresponding audio filtering parameter based on a third coordinate of a second type in the first position information and a fourth coordinate of the second type in the second position information respectively; and determining a volume parameter based on the first distance;

adjusting, in response to a second adjustment instruction, the first audio parameter to a second audio parameter;

triggering the second adjustment instruction in response to the first audio sample being replaced with a second audio sample, and adjusting the first audio parameter to the second audio parameter; and obtaining second audio data by modulating the second audio sample based on the second audio parameter;

obtaining, by an audio engine, the first distance sent by a game engine; and obtaining, by the audio engine, the first position information and the second position information sent by the game engine, and determining, by the audio engine, the first audio data based on the first position information, the second position information and the first distance;

sending, by the game engine based on a target interval time, the first position information and the second position information to the audio engine; and determining, by the audio engine, the first audio data based on the first position information and the second position information;

obtaining, by the game engine, at least one piece of third position information between the first position information and the second position information; sending, by the game engine, the first position information, each piece of the third position information, and the second position information in sequence to the audio engine within the target interval time; and determining, by the audio engine, the first audio data based on the first position information, each piece of the third position information, and the second position information, where the first audio data is used for playing audio with a gradually varied play state;

determining, by the game engine, the target interval time, and sending, by the game engine, the target interval time to the audio engine; and adjusting, by the audio engine, the target interval time in response to a third adjustment instruction, and sending, by the audio engine, the target interval time as adjusted to the game engine;

determining, in the game scene, a target coordinate system with the target position as an origin; determining, in the target coordinate system, a spherical region centered on the origin with a second distance as a radius, where audio data is allowed to be played when a distance between the virtual item and the virtual game character is less than or equal to the second distance; and determining the spherical region as the target spatial region.

A first coordinate of a first type in the first position information and a second coordinate of the first type in the second position information are used for indicating a left direction or a right direction relative to the virtual game character; a third coordinate of a second type in the first position information and a fourth coordinate of the second type in the second position information are used for indicating a front direction or a rear direction relative to the virtual game character; and/or a fifth coordinate of a third type in the first position information and a sixth coordinate of the third type in the second position information are used for indicating an up direction or a down direction relative to the virtual game character.

The present disclosure obtains the orientation change state of the virtual item during the movement from the first position information to the second position information, and sends the first position information and the second position information to the audio engine, thereby enabling the audio engine to determine and play the first audio data corresponding to the virtual item. This enables an accurate orientation representation of the fly-past sound of the virtual item, and thus achieves the technical effect of improving audio playing effects in games and solves the technical problem of poor audio playing effects in games.

In an embodiment, in this embodiment, the above computer-readable storage medium may include, but is not limited to, various kinds of media that can store a computer program such as a USB flash drive, a read-only memory (abbreviated as ROM), a random access memory (abbreviated as RAM), a removable hard drive, a magnetic disc, or a compact disc.

According to one embodiment of the present disclosure, there is also provided a processor. The processor is configured to run a program. The processor is configured to run the program, where the program is set to perform, when run by the processor, the method for processing audio in a game in the embodiments of the present disclosure.

Figure 14:
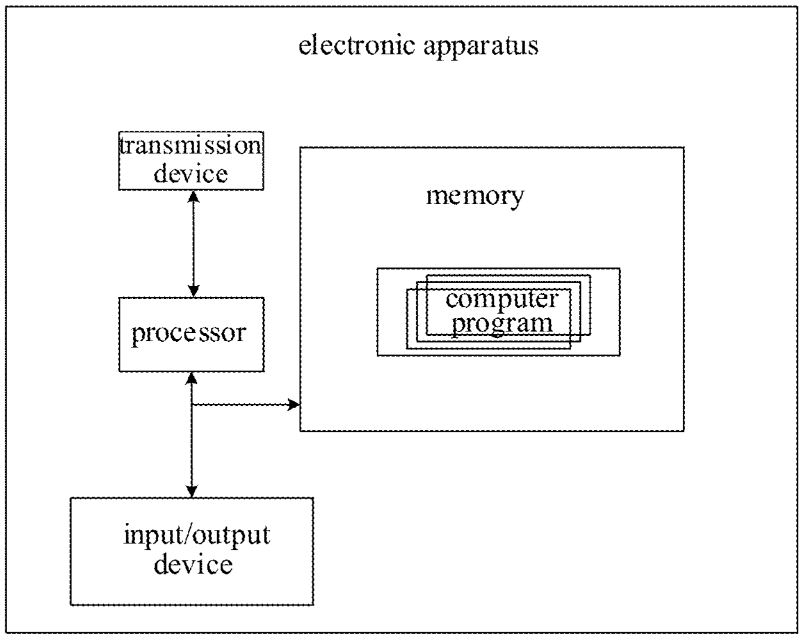
FIG. 14 is a block diagram of a structure of an electronic apparatus according to an embodiment of the present disclosure.

The embodiments of the present disclosure also provide an electronic apparatus. FIG. 14 is a block diagram of a structure of an electronic apparatus according to an embodiment of the present disclosure. As shown in FIG. 14, the electronic apparatus includes a memory and a processor, where the memory stores a computer program, and the processor is set to run the computer program to perform the steps in any method embodiments described above.

In an embodiment, the above-described electronic apparatus may further include a transmission device and an input/output device, where the transmission device is connected to the above-described processor, and the input/output device is connected to the above-described processor.

In an embodiment, in this embodiment, the above processor may be set to execute the following steps S1 to S4 through a computer program.

At step S1, a target position of a virtual game character in a game scene is determined.

At step S2, a target spatial region in the game scene is determined based on the target position.

At step S3, first position information of a virtual item when the virtual item enters the target spatial region, and second position information of the virtual item when the virtual item leaves the target spatial region are determined.

At step S4, first audio data corresponding to the virtual item is determined based on the first position information and the second position information, where the first audio data is used for indicating an orientation change state of the virtual item during movement from the first position information to the second position information.

The processor described above may also be set to execute, through a computer program, the following steps:

determining an initial intersection point between a movement trajectory of the virtual item and the target spatial region, and determining position information, in the target spatial region, of the initial intersection point as the first position information; and determining a termination intersection point between the movement trajectory of the virtual item and the target spatial region, and determining position information, in the target spatial region, of the termination intersection point as the second position information;

determining, in response to both the first position information and the second position information not exceeding a target threshold, the first audio data based on the first position information and the second position information;

determining a radius of a spherical spatial region as the target threshold, where the target spatial region is the spherical spatial region;

adjusting the radius of the spherical spatial region in response to a first adjustment instruction;

obtaining a first distance between a movement trajectory of the virtual item and the virtual game character; and determining the first audio data based on the first position information, the second position information and the first distance;

determining a first audio parameter corresponding to the first position information, the second position information and the first distance; and obtaining the first audio data by modulating a first audio sample based on the first audio parameter;

determining, based on a first coordinate of a first type in the first position information and a second coordinate of the first type in the second position information respectively, a corresponding left sound image parameter or a corresponding right sound image parameter; determining a corresponding audio filtering parameter based on a third coordinate of a second type in the first position information and a fourth coordinate of the second type in the second position information respectively; and determining a volume parameter based on the first distance;

adjusting, in response to a second adjustment instruction, the first audio parameter to a second audio parameter;

triggering the second adjustment instruction in response to the first audio sample being replaced with a second audio sample, and adjusting the first audio parameter to the second audio parameter; and obtaining second audio data by modulating the second audio sample based on the second audio parameter;

obtaining, by an audio engine, the first distance sent by a game engine; and obtaining, by the audio engine, the first position information and the second position information sent by the game engine, and determining, by the audio engine, the first audio data based on the first position information, the second position information and the first distance;

sending, by the game engine based on a target interval time, the first position information and the second position information to the audio engine; and determining, by the audio engine, the first audio data based on the first position information and the second position information;

obtaining, by the game engine, at least one piece of third position information between the first position information and the second position information; sending, by the game engine, the first position information, each piece of the third position information, and the second position information in sequence to the audio engine within the target interval time; and determining, by the audio engine, the first audio data based on the first position information, each piece of the third position information, and the second position information, where the first audio data is used for playing audio with a gradually varied play state;

determining, by the game engine, the target interval time, and sending, by the game engine, the target interval time to the audio engine; and adjusting, by the audio engine, the target interval time in response to a third adjustment instruction, and sending, by the audio engine, the target interval time as adjusted to the game engine;

determining, in the game scene, a target coordinate system with the target position as an origin; determining, in the target coordinate system, a spherical region centered on the origin with a second distance as a radius, where audio data is allowed to be played when a distance between the virtual item and the virtual game character is less than or equal to the second distance; and determining the spherical region as the target spatial region.

A first coordinate of a first type in the first position information and a second coordinate of the first type in the second position information are used for indicating a left direction or a right direction relative to the virtual game character; a third coordinate of a second type in the first position information and a fourth coordinate of the second type in the second position information are used for indicating a front direction or a rear direction relative to the virtual game character; and/or a fifth coordinate of a third type in the first position information and a sixth coordinate of the third type in the second position information are used for indicating an up direction or a down direction relative to the virtual game character.

The present disclosure obtains the orientation change state of the virtual item during the movement from the first position information to the second position information, and sends the first position information and the second position information to the audio engine, thereby enabling the audio engine to determine and play the first audio data corresponding to the virtual item. This enables an accurate orientation representation of the fly-past sound of the virtual item, and thus achieves the technical effect of improving audio playing effects in games and solves the technical problem of poor audio playing effects in games.

In an embodiment, specific examples in this embodiment may be referred to the examples described in the above embodiments and optional embodiments, which are not repeated herein.

The above serial numbers of the embodiments of the present disclosure are for descriptive purposes only and do not represent the merits of the embodiments.

In the above embodiments of the present disclosure, each embodiment has its own emphasis on description. For the parts not described in detail in one embodiment, please refer to the relevant descriptions of other embodiments.

In several embodiments provided in the present disclosure, it should be understood that the disclosed technical content can be implemented in other ways. The apparatus embodiments described above are only illustrative. For example, the division of units may be a logical functional division, and there may be other division methods in actual implementation. For example, a plurality of units or components may be combined or integrated into another system, or some features may be ignored or not executed. On the other hand, the mutual coupling or direct coupling or communication connection displayed or discussed may be indirect coupling or communication connection through some interfaces, units or modules, which may be electrical or other forms.

The units illustrated as separate components may or may not be physically separated, and the components shown as units may or may not be physical units, i.e., they may be located in one place or may be distributed over a plurality of units. Some or all of these units may be selected according to actual needs to achieve the purpose of the solution in the embodiment.

In addition, various functional units in various embodiments of the present disclosure may be integrated in a single processing unit, each unit may be physically present separately, or two or more units may be integrated in a single unit. The integrated unit may be implemented either in the form of hardware or in the form of a software functional unit.

The integrated unit, when implemented as a software functional unit and sold or used as a stand-alone product, may be stored in a computer-readable storage medium. Based on this understanding, the technical solution of the present disclosure, in essence, or the part that contributes to the related art, or the whole or part of the technical solution, may be embodied in the form of a software product, the computer software product is stored in a storage medium and includes one or more instructions to enable a computer device (which may be a personal computer, a server, or a network device, etc.) to execute all or a part of the steps of the method described in the embodiments of the present disclosure. The aforementioned storage medium includes various media that can store program code such as a USB flash drive, a read-only memory (ROM), a random access memory (RAM), a removable hard drive, a magnetic disc, or a compact disc.

The foregoing is only the preferred embodiment of the present disclosure, and it should be noted that for those ordinary skilled in the art, one or more improvements and embellishments may be made without departing from the principles of the present disclosure, and the improvements and embellishments shall also be considered as the scope of protection of the present disclosure.

What is claimed is:

1. A method for processing audio in a game, comprising:
- determining, by a terminal device, a target position of a virtual game character in a game scene;
- determining, by the terminal device based on the target position, a target spatial region in the game scene;
- determining, by the terminal device, a first position of a virtual item in response to determining that the virtual item enters the target spatial region, and a second position of the virtual item in response to determining that the virtual item leaves the target spatial region; and
- determining, by the terminal device based on the first position and the second position, first audio data corresponding to the virtual item, wherein the first audio data is configured for indicating an orientation change state-of the virtual item during movement from the first position to the second position.

2. The method according to claim 1, wherein the determining the first position and the second position of the virtual item comprises:
- determining an initial intersection point between a movement trajectory of the virtual item and the target spatial region, and determining a position, in the target spatial region, of the initial intersection point as the first position; and
- determining a termination intersection point between the movement trajectory of the virtual item and the target spatial region, and determining a position, in the target spatial region, of the termination intersection point as the second position.

3. The method according to claim 1, wherein the determining the first audio data corresponding to the virtual item comprises:
- determining, in response to the first position and the second position not exceeding a target threshold, the first audio data based on the first position and the second position.

4. The method according to claim 3, wherein the target spatial region is a spherical spatial region, and the method further comprises:
- determining a radius of the spherical spatial region as the target threshold.

5. The method according to claim 4, further comprising:
- adjusting the radius of the spherical spatial region in response to a first adjustment instruction.

6. The method according to claim 1, further comprising:
- obtaining a first distance between a movement trajectory of the virtual item and the virtual game character; wherein the determining the first audio data corresponding to the virtual item comprises:

determining the first audio data based on the first position, the second position and the first distance.

7. The method according to claim 6, wherein the determining the first audio data based on the first position, the second position and the first distance comprises:

determining a first audio parameter corresponding to the first position, the second position and the first distance; and obtaining the first audio data by modulating a first audio sample based on the first audio parameter.

8. The method according to claim 7, wherein the determining the first audio parameter comprises:

determining, based on a first coordinate of a first type in the first position and a second coordinate of the first type in the second position, a corresponding left right sound image parameter;

determining a corresponding audio filtering parameter based on a third coordinate of a second type in the first position and a fourth coordinate of the second type in the second position; and determining a volume parameter based on the first distance.

9. The method according to claim 7, further comprising:

adjusting, in response to a second adjustment instruction, the first audio parameter to a second audio parameter.

10. The method according to claim 9, further comprising:

triggering the second adjustment instruction in response to the first audio sample being replaced with a second audio sample; and obtaining second audio data by modulating the second audio sample based on the second audio parameter.

11. The method according to claim 6, wherein the obtaining the first distance comprises: obtaining, through an audio engine of the terminal device, the first distance sent by a game engine of the terminal device; and the determining the first audio data based on the first position, the second position and the first distance comprises:

obtaining, through the audio engine, the first position and the second position sent by the game engine, and determining, through the audio engine, the first audio data based on the first position, the second position and the first distance.

12. The method according to claim 1, wherein the determining, the first audio data corresponding to the virtual item comprises:

sending, through a game engine of the terminal device based on a target interval time, the first position and the second position to an audio engine of the terminal device; and determining, through the audio engine, the first audio data based on the first position and the second position.

13. The method according to claim 12, further comprising:

obtaining, through the game engine, at least third position between the first position and the second position; wherein the sending, through the game engine based on the target interval time, the first position and the second position to the audio engine comprises: sending, through the game engine, the first position, each of the at least one third position, and the second position in sequence to the audio engine within the target interval time; and the determining, through the audio engine, the first audio data based on the first position and the second position comprises: determining, through the audio engine, the first audio data based on the first position, each of the at least one third position, and the second position, wherein the first audio data is used for playing audio with a gradually varied play state.

14. The method according to claim 12, further comprising:

determining, through the game engine, the target interval time, and sending, through the game engine, the target interval time to the audio engine; and adjusting, through the audio engine, the target interval time in response to a third adjustment instruction, and sending, through the audio engine, the target interval time as adjusted to the game engine.

15. The method according to claim 1, wherein the determining the target spatial region in the game scene comprises:

determining, in the game scene, a target coordinate system with the target position as an origin;

determining, in the target coordinate system, a spherical region centered on the origin with a second distance as a radius, wherein audio data is allowed to be played in response to a distance between the virtual item and the virtual game character being less than or equal to the second distance; and determining the spherical region as the target spatial region.

16. The method according to claim 1, wherein a first coordinate of a first type in the first position and a second coordinate of the first type in the second position are used for indicating a left direction or a right direction of the virtual item relative to the virtual game character;

a third coordinate of a second type in the first position and a fourth coordinate of the second type in the second position are used for indicating a front direction or a rear direction of the virtual item relative to the virtual game character; or a fifth coordinate of a third type in the first position and a sixth coordinate of the third type in the second position are used for indicating an up direction or a down direction of the virtual item relative to the virtual game character.

17. A non-transitory computer-readable storage medium, wherein the computer-readable storage medium stores a computer program, and the computer program, when executed by a processor, causes the processor to perform a method for processing audio in a game, wherein the method comprises:

determining a target position of a virtual game character in a game scene;

determining, based on the target position, a target spatial region in the game scene;

determining a first position of a virtual item in response to determining that the virtual item enters the target spatial region, and a second position of the virtual item in response to determining that the virtual item leaves the target spatial region; and determining, based on the first position and the second position, first audio data corresponding to the virtual item, wherein the first audio data is configured for indicating an orientation change of the virtual item during movement from the first position to the second position.

18. An electronic apparatus, comprising a memory and a processor, wherein the memory stores a computer program, and the processor, through executing the computer program, is configured to:

determine a target position of a virtual game character in a game scene;

determine, based on the target position, a target spatial region in the game scene;

determine a first position of a virtual item in response to determining that the virtual item enters the target spatial region, and a second position of the virtual item in response to determining that the virtual item leaves the target spatial region; and determine, based on the first position and the second position, first audio data corresponding to the virtual item, wherein the first audio data is configured for indicating an orientation change of the virtual item during movement from the first position to the second position.

19. The electronic apparatus according to claim 18, wherein the processor is specifically configured to:

determine an initial intersection point between a movement trajectory of the virtual item and the target spatial region, and determine a position, in the target spatial region, of the initial intersection point as the first position; and determine a termination intersection point between the movement trajectory of the virtual item and the target spatial region, and determine a position, in the target spatial region, of the termination intersection point as the second position.

20. The electronic apparatus according to claim 18, wherein the processor is specifically configured to:

determine, in response to the first position and the second position not exceeding a target threshold, the first audio data based on the first position and the second position.

* * * * *